United States Patent
Kim et al.

(10) Patent No.: US 11,955,128 B2
(45) Date of Patent: Apr. 9, 2024

(54) METHOD FOR VOICE IDENTIFICATION AND DEVICE USING SAME

(71) Applicant: SAMSUNG ELECTRONICS CO., LTD., Suwon-si (KR)

(72) Inventors: Cheheung Kim, Yongin-si (KR); Jaehyung Jang, Anyang-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 70 days.

(21) Appl. No.: 17/402,148

(22) Filed: Aug. 13, 2021

(65) Prior Publication Data

US 2022/0270613 A1  Aug. 25, 2022

(30) Foreign Application Priority Data

Feb. 25, 2021  (KR) ........................ 10-2021-0025962

(51) Int. Cl.
| | |
|---|---|
| G10L 17/06 | (2013.01) |
| G06F 21/32 | (2013.01) |
| G10L 15/02 | (2006.01) |
| G10L 25/15 | (2013.01) |
| G10L 25/51 | (2013.01) |
| G10L 17/10 | (2013.01) |
| G10L 25/18 | (2013.01) |

(52) U.S. Cl.
CPC .............. *G10L 17/06* (2013.01); *G06F 21/32* (2013.01); *G10L 15/02* (2013.01); *G10L 25/15* (2013.01); *G10L 25/51* (2013.01); *G10L 17/10* (2013.01); *G10L 25/18* (2013.01)

(58) Field of Classification Search
CPC ......... G10L 17/06; G10L 15/02; G10L 25/15; G10L 25/51; G10L 17/10; G10L 25/18; G06F 21/32

USPC ........................................................ 704/246
See application file for complete search history.

(56) References Cited

U.S. PATENT DOCUMENTS

| | | | | |
|---|---|---|---|---|
| 6,012,334 | A | * | 1/2000 | Ando ........................ G01H 3/08 73/648 |
| 8,069,039 | B2 | * | 11/2011 | Yoshioka ................ G10L 25/87 704/214 |

(Continued)

FOREIGN PATENT DOCUMENTS

| | | | |
|---|---|---|---|
| CN | 110164453 A | * | 8/2019 |
| CN | 110164453 A | | 8/2019 |

(Continued)

OTHER PUBLICATIONS

Communication dated Apr. 25, 2022, issued by the European Patent Office in European Application No. 21212786.4.

*Primary Examiner* — Edwin S Leland, III
(74) *Attorney, Agent, or Firm* — Sughrue Mion, PLLC

(57) ABSTRACT

An electronic device may include: a memory; a sound sensor; and a processor, wherein the processor is configured to: receive, from the sound sensor, sound data including a first piece of data corresponding to a first frequency band and a second piece of data corresponding to a second frequency band different from the first frequency band; receive voice data related to a voice of a registered user from the memory; perform voice identification by comparing the first piece of data and the second piece of data with the voice data related to the voice of the registered user; and determine an output based on a result of the voice identification.

14 Claims, 14 Drawing Sheets

(56) References Cited

U.S. PATENT DOCUMENTS

| | | | | |
|---|---|---|---|---|
| 9,697,828 B1* | 7/2017 | Prasad | ............... | G10L 15/08 |
| 10,566,011 B2* | 2/2020 | Park | ............... | G10L 17/22 |
| 11,532,306 B2* | 12/2022 | Kim | ............... | H04R 1/406 |
| 11,769,510 B2* | 9/2023 | Lesso | ............... | H04R 19/04 |
| | | | | 704/249 |
| 2008/0154585 A1* | 6/2008 | Yoshioka | ............... | G10L 25/87 |
| | | | | 704/E15.005 |
| 2016/0240194 A1* | 8/2016 | Lee | ............... | G10L 15/32 |
| 2018/0261225 A1* | 9/2018 | Watanabe | ............... | G10L 15/20 |
| 2018/0336892 A1* | 11/2018 | Kim | ............... | H04R 3/005 |
| 2019/0074009 A1* | 3/2019 | Kim | ............... | G10L 15/08 |
| 2019/0348050 A1* | 11/2019 | Kim | ............... | G10L 17/14 |
| 2020/0286492 A1* | 9/2020 | Lesso | ............... | G10L 25/18 |
| 2021/0097998 A1* | 4/2021 | Kim | ............... | G10L 15/18 |
| 2022/0270613 A1* | 8/2022 | Kim | ............... | G10L 17/06 |

FOREIGN PATENT DOCUMENTS

| | | |
|---|---|---|
| JP | 3867057 B2 | 1/2007 |
| JP | 3886483 B2 | 2/2007 |
| JP | 2020503570 A | 1/2020 |
| KR | 1020180051189 A | 5/2018 |

* cited by examiner

FIG. 4

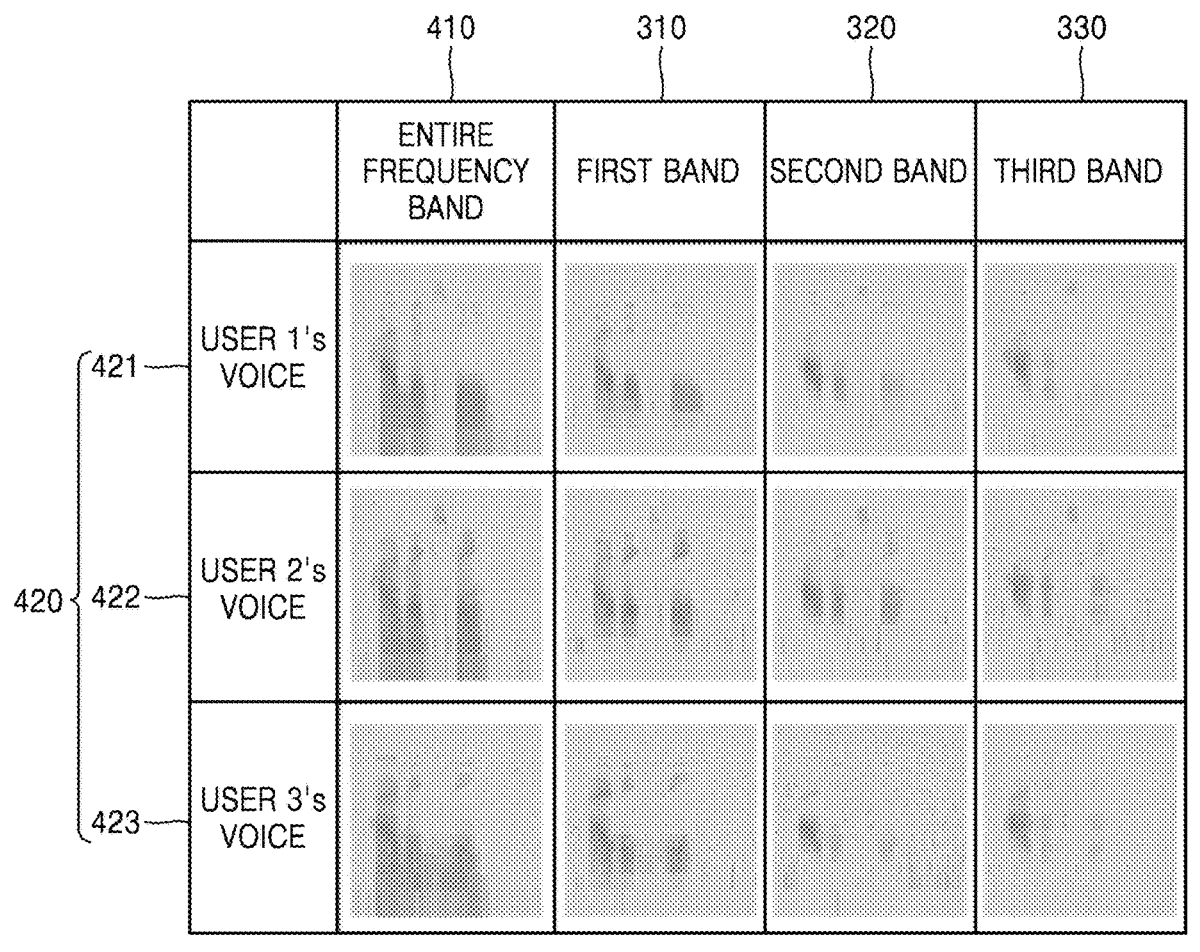

| | ENTIRE FREQUENCY BAND 410 | FIRST BAND 310 | SECOND BAND 320 | THIRD BAND 330 |
|---|---|---|---|---|
| USER 1's VOICE (421) | | | | |
| USER 2's VOICE (422) | | | | |
| USER 3's VOICE (423) | | | | |

METHOD FOR VOICE IDENTIFICATION AND DEVICE USING SAME

CROSS-REFERENCE TO RELATED APPLICATION

This application is based on and claims priority under 35 U.S.C. § 119 to Korean Patent Application No. 10-2021-0025962, filed on Feb. 25, 2021, in the Korean Intellectual Property Office, the disclosure of which is incorporated by reference herein in its entirety.

BACKGROUND

1. Field

The disclosure relates to a method for voice identification using a multi-frequency band sound sensor and a device for voice identification.

2. Description of the Related Art

Voice identification technology has been used in various fields. Voice identification may provide convenience by identifying a user's voice input to an electronic device. For example, voice identification may be performed on a user's voice input to an electronic device to complete online shopping.

An electronic device including a sound sensor or the like may perform voice identification using an artificial intelligence (AI) assistant (for example, an AI voice agent). For example, services or systems such as voice shopping, ordering through a kiosk of a restaurant, reservation ticketing systems, financial services, and contactless response services may be set to be available for only users of particular electronic devices who have been previously identified by voice identification. However, if users are able to be identified using only their voices, users of electronic devices may more conveniently use services or systems in various fields.

Voice identification methods are required to accurately identify the voice of authorized users. A voice user interface (VUI) may include a voice recognition technique, a voice synthesis technique, a speaker recognition technique, and the like. A VUI may recognize the voice of a legitimate user of an electronic device through voice identification.

In addition to the use of voice identification in various fields, there has been increasing demand for techniques for improving the accuracy and security of voice identification. The accuracy of voice identification may decrease due to variations in the voice of a user of an electronic device. For example, the accuracy of voice identification may be decreased due to: time-varying characteristics of organs such as the vocal cords, neck, oral cavity, and nasal cavity of a user of an electronic device; and short-term body condition variations caused by diseases such as a cold.

Training data reflecting various surrounding environments and user's conditions may be required for accurate voice identification using a VUI. However, it is difficult to prepare a training database reflecting all surrounding environments and user's conditions.

SUMMARY

One or more example embodiments provide a method for voice identification using a multi-frequency band sound sensor and a device for voice identification.

Additional aspects will be set forth in part in the description which follows and, in part, will be apparent from the description, or may be learned by practice of the presented embodiments of the disclosure.

According to an aspect of the disclosure, there is provided an electronic device comprising: a memory; a sound sensor; and a processor configured to: receive, from the sound sensor, sound data comprising a first piece of data corresponding to a first frequency band and a second piece of data corresponding to a second frequency band different from the first frequency band; receive voice data related to a voice of a registered user from the memory; perform voice identification by comparing the first piece of data and the second piece of data with the voice data related to the voice of the registered user; and determine an output based on a result of the voice identification.

The sound sensor may comprise a plurality of mechanical oscillators configured to sense the sound data according to frequency bands.

The plurality of mechanical oscillators may comprise: at least one first mechanical oscillator configured to sense the sound data in a first band; and at least one second mechanical oscillator configured to sense the sound data in a second band.

The voice data related to the voice of the registered user may comprise first voice data in the first frequency band and second voice data in the second frequency band.

The processor may be further configured to perform the voice identification by comparing the first piece of data with the first voice data in the first frequency band, and the second piece of data with the second voice data in the second frequency band.

The processor may be further configured to perform the voice identification by: determining a first representative value corresponding to the first piece of data and a second representative value corresponding to the second piece of data; and comparing a weighted sum of the first representative value and the second representative value with a threshold value.

The processor may be further configured to perform the voice identification by: determining a weighted sum of raw data of the first piece of data and raw data of the second piece of data; and comparing the weighted sum with a threshold value.

The processor may be further configured to: determine, based on a result of the comparing the first piece of data and the first voice data in the first frequency band, whether the sound data matches the voice of the registered user in the first frequency band; and determine, based on a result of the comparing the second piece of data and the second voice data in the second frequency band, whether the sound data matches the voice of the registered user in the second frequency band.

The processor may be further configured to determine that the voice identification is successful when the weighted sum is greater than the threshold value.

The processor may be further configured to determine that the voice identification is successful when a sum of a result of the determination in the first frequency band and a result of the determination in the second frequency band is greater than a threshold value.

According to another aspect of the disclosure, there is provided a method of identifying a voice using an electronic device, the method comprising: receiving, from a sound sensor, sound data comprising a first piece of data corresponding to a first frequency band and a second piece of data corresponding to a second frequency band different from the first frequency band; receiving voice data related to a voice of a registered user from a memory; performing voice identification by comparing the first piece of data and the second piece of data with the voice data related to the voice of the registered user; and determining an output based on a result of the voice identification.

The sound sensor may comprise a plurality of mechanical oscillators, and the method further comprises sensing the sound data according to frequency bands by using the plurality of mechanical oscillators.

The sensing of the sound data according to the frequency bands may comprise: sensing the sound data in a first band by using at least one first mechanical oscillator among the plurality of mechanical oscillators; and sensing sound data in a second band by using at least one second mechanical oscillator among the plurality of mechanical oscillators.

The voice data related to the voice of the registered user may comprise first voice data in the first frequency band and second voice data in the second frequency band.

The performing of the voice identification may comprise: comparing the first piece of data with the first voice data in the first frequency band; and comparing the second piece of data with the second voice data in the second frequency band.

The performing of the voice identification may further comprise: determining a first representative value corresponding to the first piece of data and a second representative value corresponding to the second piece of data; and comparing a weighted sum of the first representative value and the second representative value with a threshold value.

The performing of the voice identification may further comprise: determining a weighted sum of raw data of the first piece of data and raw data of the second piece of data; and comparing the weighted sum with a threshold value.

The method may further comprise: determining, based on result of the comparing the first piece of data and the first voice data in the first frequency band, whether the sound data matches the voice of the registered user in the first frequency band; and determining, based on a result of the comparing the second piece of data and the second voice data in the second frequency band, whether the sound data matches the voice of the registered user in the second frequency band.

The determining of the output may comprise determining that the voice identification is successful when the weighted sum is greater than the threshold value.

The determining of the output may comprise determining that the voice identification is successful when a sum of a result of the determining in the first frequency band and a result of the determining in the second frequency band is greater than a threshold value.

According to another aspect of the disclosure, there is provided an electronic device comprising: a memory storing one or more instructions; a processor configured to execute the one or more instructions to: receive sound data comprising a first sound data corresponding to a first frequency band and a second sound data corresponding to a second frequency band different from the first frequency band; receive stored voice data related to a voice of a user, the stored voice data comprising a first voice data corresponding to the first frequency band and a second voice data corresponding to the second frequency band; and perform voice identification by separately comparing the first sound data with the first voice data and the second sound data with the second voice data.

According to another aspect of the disclosure, there is provided an electronic device comprising: a memory storing one or more instructions; a processor configured to execute the one or more instructions to: receive sound data comprising a first sound data corresponding to a first characteristic feature and a second sound data corresponding to a second characteristic feature; receive stored voice data related to a voice of a user, the stored voice data comprising a first voice data corresponding to the first characteristic feature and a second voice data corresponding to the second characteristic feature; and perform voice identification by separately comparing the first sound data with the first voice data and the second sound data with the second voice data.

According to another aspect of the disclosure, there is provided a method comprising: receiving sound data comprising a first sound data corresponding to a first characteristic feature and a second sound data corresponding to a second characteristic feature; receiving stored voice data related to a voice of a user, the stored voice data comprising a first voice data corresponding to the first characteristic feature and a second voice data corresponding to the second characteristic feature; and performing voice identification by separately comparing the first sound data with the first voice data and the second sound data with the second voice data.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 4 is an example view illustrating the energy of voice data of users for comparison according to frequency bands by a voice identification method according to various example embodiments;

DETAILED DESCRIPTION

Figure 1:
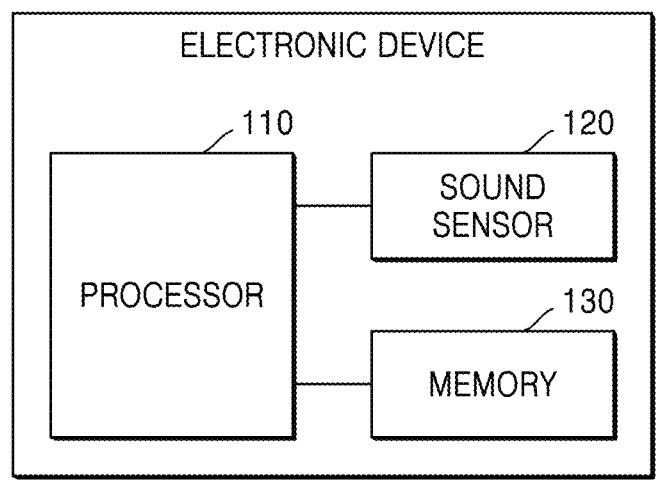
FIG. 1 is a block diagram illustrating elements of an electronic device according to various example embodiments.

Reference will now be made in detail to example embodiments, examples of which are illustrated in the accompanying drawings, wherein like reference numerals refer to like elements throughout. In this regard, the example embodiments may have different forms and should not be construed as being limited to the descriptions set forth herein. Accordingly, the example embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

The terms used in example embodiments are selected based on general terms currently widely used in the art, but the terms may vary according to the intention of those of ordinary skill in the art, precedents, or new technology in the art. Also, some terms may be arbitrarily selected by the applicant(s), and in this case, the meaning of the selected terms are described in the detailed description of the disclosure. Thus, the terms used herein should not be construed based on only the names of the terms but should be construed based on the meaning of the terms together with the description throughout the present disclosure.

In the following descriptions of the example embodiments, expressions or terms such as "constituted by," "formed by," "include," "comprise," "including," and "comprising" should not be construed as always including all specified elements, processes, or operations, but may be construed as not including some of the specified elements, processes, or operations, or further including other elements, processes, or operations.

In the example embodiments, "units" and/or "modules" of the disclosure may be implemented by a hardware component, a software component or a combination including both hardware and software components. For example, "units" and/or "modules" of the disclosure may be implemented by circuitry.

In the example embodiments, when a portion or element is referred to as being connected to another portion or element, the portion or element may be directly connected to the other portion or element, or may be electrically connected to the other portion or element with intervening portions or elements being therebetween.

In addition, although terms such as "first" and "second" are used to describe various elements, these elements should not be limited by these terms. These terms are only used to distinguish one element from other elements.

Embodiments will now be described with reference to the accompanying drawings. However, the idea of the present disclosure may be implemented in various ways and is not limited to the example embodiments described herein.

FIG. 1 is a block diagram illustrating elements of an electronic device 100 according to various example embodiments.

Referring to FIG. 1, the electronic device 100 may include a processor 110, a sound sensor 120, and a memory 130. For example, the electronic device 100 may receive voice data of a user. The electronic device 100 may include a portable terminal and an electronic unit equipped with an unmanned response system (for example, a kiosk). Elements of the electronic device 100 which are shown in FIG. 1 are merely non-limiting examples, and the electronic device 100 may include other elements instead of or in addition to the elements shown in FIG. 1.

Referring to FIG. 1, the sound sensor 120 may sense sound information through a sensor module and the processor 110 may receive the sound information. For example, the processor 110 may receive, in each frequency band, at least one piece of sound data which is sensed using the sound sensor 120. The processor 110 may separately receive a first piece of data including sound data in a first band and a second piece of data including sound data in a second band.

Referring to FIG. 1, the processor 110 may perform voice identification for one or more users who are registered as users of the electronic device 100. For example, the processor 110 may perform voice identification for User 1, User 2, and User 3 of the electronic device 100. The electronic device 100 may store data related to the voice of User 1 (voice data of user1), data related to the voice of User 2, and data related to the voice of User 3 in the memory 130. The processor 110 may compare, in each band, received sound data with data related to the voice of at least one user who is preset as a user of the electronic device 100.

Referring to FIG. 1, the processor 110 may calculate, in each band, at least one piece of sound data sensed using the sound sensor 120. For example, the processor 110 may calculate a first representative value corresponding to the first piece of data, and a second representative value corresponding to the second piece of data. The processor 110 may compare a weighted sum of the first representative value and the second representative value with a threshold value. According to an example embodiment, the threshold value may be preset. According to another example embodiment, the processor 110 may calculate a weighted sum of raw data of the first piece of data and raw data of the second piece of data. The processor 110 may compare the calculated weighted sum with a threshold value. According to an example embodiment, the threshold value may be preset. While performing voice identification, the processor 110 may determine that the voice identification is successful when a calculated result is greater than a preset threshold value. While performing voice identification, the processor 110 may determine that the voice identification is unsuccessful when a calculated result is less than a preset threshold value. According to an example embodiment, when more than fifty percent of results out of the determination in the first band, the determination in the second band, . . . , and the determination in an nth band (for example, n is an odd number) are acceptances (for example, when 1, among 1 and 0, refers to acceptance, and 0 refers to rejections, and the number of 1s is greater than n/2), the processor 110 may determine that the voice identification is successful. When more than fifty percent of results out of the determination in the first band, the determination in the second band, . . . , and the determination in the nth band (for example, n is an odd number) are rejections (for example, when 1, among 1 and 0, refers to acceptance and 0 refers to rejections, and the number of 0s is greater than n/2), the processor 110 may determine that the voice identification is unsuccessful. However, the method of determining voice identification is not limited to determining voice identification as successful based on the majority of results of determination in a plurality of bands, and for example, voice identification may be determined as successful based on a preset number of determination results which is preset according to design specifications of a manufacture. According to an example embodiment, the preset number may be 2.

Referring to FIG. 1, the sound sensor 120 may detect at least one piece of sound data. For example, the sound sensor 120 may detect, as sound data, a voice input in response to a starting phrase (for example, a greeting) of an artificial intelligence (AI) assistant built in and executed on the electronic device 100. The sound sensor 120 may include a plurality of mechanical oscillators, and the plurality of mechanical oscillators may sense sound data according to frequency bands. According to an example embodiment, the sound sensor 120 may include twenty mechanical oscillators (i.e., first oscillator, second oscillator, . . . twentieth oscillator), and the mechanical oscillators may have different detectable frequency bands. However, the number of mechanical oscillators are not limited to twenty according to another example embodiment. The sound sensor 120 may detect sound data in the first band using a mechanical oscillator (for example, the first mechanical oscillator). The sound sensor 120 may detect sound data in the second band using two or more mechanical oscillators (for example, the second mechanical oscillator and the seventh mechanical oscillator). The detectable frequency band of one mechanical oscillator or two or more mechanical oscillators, and the combination of mechanical oscillators are not limited to the examples above, but may be customized according to user settings.

Referring to FIG. 1, data related to the voice of a user of the electronic device 100 may be stored in the memory 130. For example, data related to the voice of User 1, User 2, and User 3, who are set as users of the electronic device 100, may be stored in the memory 130. The memory 130 may store data related to arbitrary constants which the processor 110 may use to calculate the first representative value corresponding to the first piece of data and the second representative value corresponding to the second piece of data. For example, the memory 130 may store data related to a constant c1 required to calculate sound data in the first band as a first representative value, and a constant c2 required to calculate sound data in the second band as a second representative value. The memory 130 may store data related to threshold values with which the processor 110 may compare results of calculation during voice identification. For example, the memory 130 may store data related to a threshold value to be compared with a weighted sum of representative values and a threshold value to be compared with a weighted sum of raw data. The memory 130 may store data in advance, or may store data in real time through an external connection port of the electronic device 100 or a communication module that may be included in the electronic device 100. For example, the communication module may be a wired communication module or a wireless communication module.

Although the case in which the processor 110 of the electronic device 100 performs voice identification for users has been described with reference to FIG. 1, the processor 110 may transmit at least one piece of sound data sensed using the sound sensor 120 to a separate server through a communication module (not shown) in other example embodiments. In this case, the server may include a separate memory and a separate processor, and data related to the voice of users of the electronic device 100 may be previously stored in the separate memory. The processor of the server may perform user's voice identification on the at least one piece of sound data received through the communication module. The processor of the server may perform voice identification in the same manner as the processor 110 of the electronic device 100 performs voice identification.

Figure 2A:
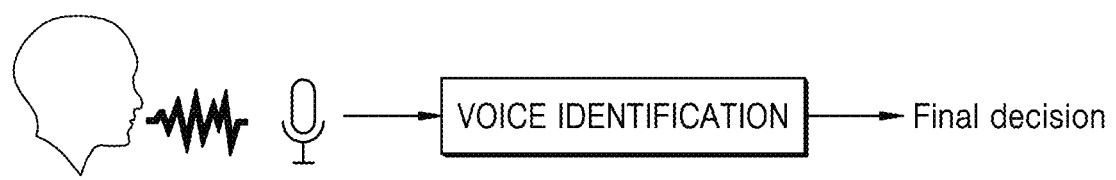
FIG. 2A is an example view illustrating a method of identifying voices collected using a microphone according to various example embodiments.

FIG. 2A is an example view illustrating a method of identifying a voice collected using a microphone according to various example embodiments.

Referring to FIG. 2A, the microphone of an electronic device (for example, the electronic device 100 shown in FIG. 1) may receive sound data (for example, a voice of an authenticated user/unauthenticated user which is input to the electronic device). Voice identification may be performed by a processor (for example, the processor 110 shown in FIG. 1) that may be included in the electronic device, a voice identification module (for example, a module capable of performing voice identification) including a processor, or the like. The voice identification module may perform voice identification by analyzing a signal (for example, a voice or sound data) acquired using the microphone to compare the signal with data (for example, data related to the voice of User 1, data related to the voice of User 2, or data related to the voice of User 3) related to the voice of a registered user (for example, User 1, User 2, or User 3 of the electronic device) in each frequency band. The voice identification module may determine the voice identification for identifying a registered user as successful or unsuccessful based on results of the comparison (for example, refer to the final decision in FIG. 2A).

Figure 2B:
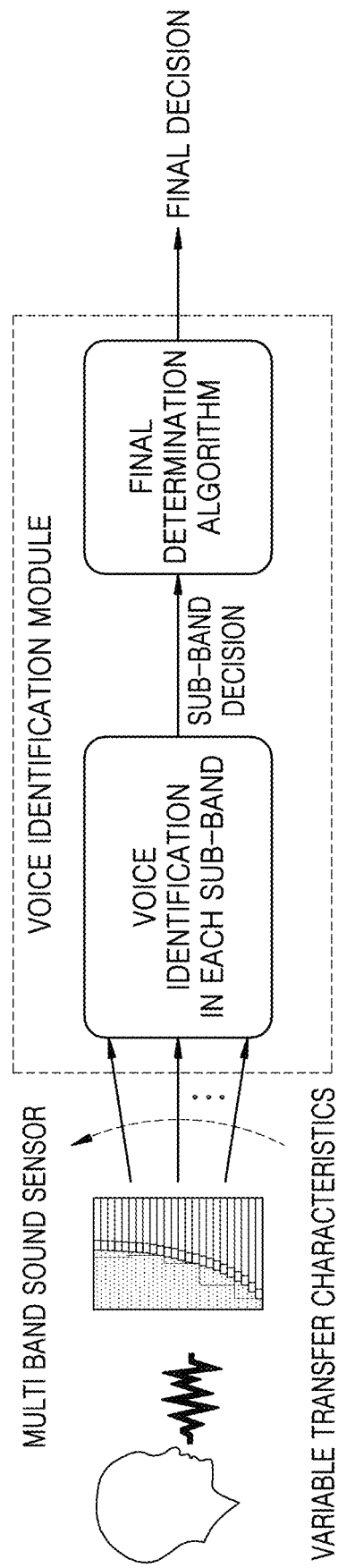
FIG. 2B is an example view illustrating a method of identifying voices collected using a sound sensor according to various example embodiments.

FIG. 2B is an example view illustrating a method of identifying a voice collected using a sound sensor according to various example embodiments.

Referring to FIG. 2B, the sound sensor (for example, the sound sensor 120 shown in FIG. 1 or a multi-band sound sensor shown in FIG. 2B) may include an array of a plurality of mechanical oscillators unlike the microphone shown in FIG. 2A. Each of the mechanical oscillators may have a resonant frequency according to the shape thereof and may function as a band pass filter (in particular, an acoustic band pass filter) for a given frequency band. For example, the mechanical oscillators may have a harmonic resonant mode and may thus have frequency band characteristics (variable transfer characteristics) in a wide frequency range unlike analog filters or digital filters.

Referring to FIG. 2B, the sound sensor of an electronic device (for example, the electronic device 100 shown in FIG. 1) may detect sound data (for example, a voice of a user which is input to the electronic device). According to an example embodiment the user may be an authenticated user or an unauthenticated user. According to an example embodiment, voice identification may be performed by a processor (for example, the processor 110 shown in FIG. 1) that may be included in the electronic device. In another embodiment, voice identification may be performed by a separate server that receives the sound data from the electronic device by data communication. In this case, the voice identification may be performed by a processor of the server.

A voice identification module may perform voice identification by analyzing a signal (for example, a voice or sound data) acquired using the sound sensor to determine the signal by comparing the signal with data related to the voice of a registered user in each frequency band. According to an example embodiment, the voice identification module may compare data related to the voice of User 1, data related to the voice of User 2, or data related to the voice of User 3 with a registered User 1, User 2, or User 3 of the electronic device in each frequency band.

When performing voice identification, the processor may perform a voice identification process in each sub-band and may determine final results of the voice identification by applying a final determination algorithm to decisions in the sub-bands. For example, the final determination algorithm may include a voting algorithm, a weighted sum algorithm, a neural network algorithm, or the like. The processor may use at least one of the listed determination algorithms according to the voice identification process in each sub-band and results of decisions in the sub-bands. The voice identification module may determine the voice identification as successful or unsuccessful based on results obtained using the final determination algorithm (for example, refer to the final decision shown in FIG. 2B).

Figure 3:
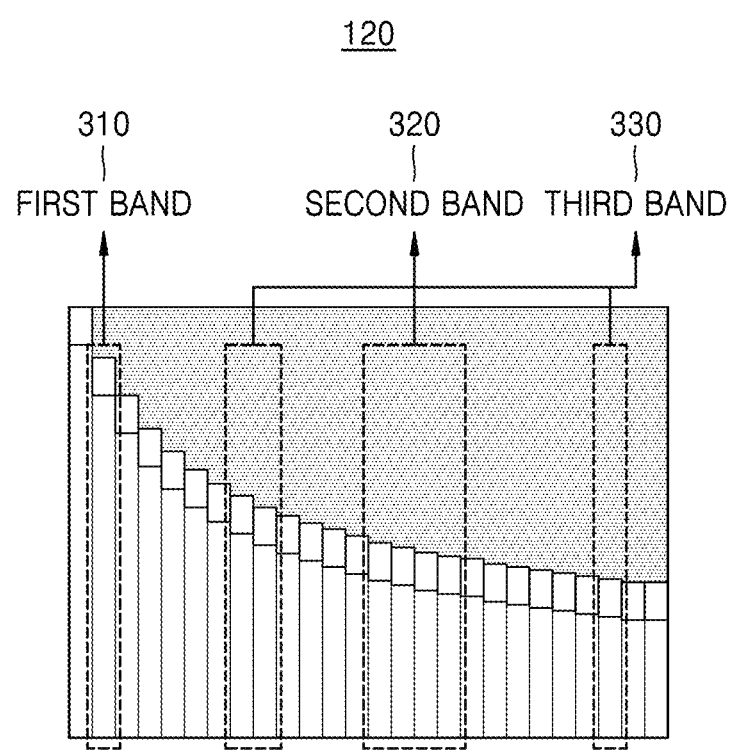
FIG. 3 is an example view illustrating a multi-band sound sensor according to various example embodiments.

FIG. 3 is an example view illustrating a multi-band sound sensor as an example of a sound sensor 120 according to various example embodiments.

Referring to FIG. 3, the sound sensor 120 of an electronic device (for example, the electronic device 100 shown in FIG. 1) may detect multi-band sound data. For example, the sound sensor 120 may detect at least one piece of sound data. For example, the sound sensor 120 may detect, as sound data, a voice input in response to a starting phrase (for example, a greeting) of an AI assistant built in and executed in the electronic device.

Referring to FIG. 3, the sound sensor 120 may include a plurality of mechanical oscillators. For example, in the sound sensor 120 shown according to an example embodiment in FIG. 3, one long vertical bar may refer to one mechanical oscillator. The sound sensor 120 may have different detectable frequency bands according to the lengths of the mechanical oscillators. For example, a high frequency band may be detected with a short mechanical oscillator (or a thick mechanical oscillator). In FIG. 3, one mechanical oscillator may sense sound data in a first band 310 and four mechanical oscillators may sense sound data in a second band 320. The second band 320, in which the four oscillators having a great thickness sense sound data, may be higher than the first band 310. Sound data in a third band 330 may be sensed using three mechanical oscillators, and because sound data in the third band 330 is sensed using resonant frequency characteristics, the third band 330 may be lower than the second band 320. The example described with reference to FIG. 3 is merely a non-limiting example, and the sound sensor 120 including the plurality of mechanical oscillators may be differently configured according to manufacturing process specifications.

Referring to FIG. 3, the sound sensor 120 may detect sound data in a plurality of frequency bands by using one or more mechanical oscillators. For example, sound data input to the sound sensor 120 may be sensed distinguishably in the first band 310, the second band 320, and the third band 330. In another example embodiment, sound data sensed using the sound sensor 120 may be transmitted to a processor (for example, the processor 110 shown in FIG. 1) distinguishably in the first band 310, the second band 320, and the third band 330. The process of dividing sound data according to frequency bands using the sound sensor 120 or the processor may be performed by a method of sensing sound data according to frequency bands previously set in the sound sensor 120, a method in which sound data sensed using the sound sensor 120 is received by the processor distinguishably in preset frequency bands, or a combination of the two methods.

FIG. 4 is an example view illustrating the energy of voice data of users for comparison according to frequency bands by a voice identification method according to various embodiments.

A processor (for example, the processor 110 shown in FIG. 1) may perform voice identification for a plurality of users registered as users of an electronic device (for example, the electronic device 100 shown in FIG. 1). For example, the processor may perform voice identification for User 1, User 2, and User 3 registered as users of the electronic device. The processor may determine whether received sound data matches at least one of User 1, User 2, and User 3. For example, the processor may compare received sound data with voice data of User 1, voice data of User 2, and voice data of User 3 which are stored in a memory (for example, the memory 130 shown in FIG. 1) to determine whether the received sound data matches at least one of User 1, User 2, and User 3.

Referring to FIG. 4, registered users of the electronic device may be User 1, User 2, and User 3. For example, voice data 420 may include data 421 related to User 1's voice, data 422 related to User 2's voice, and data 423 related to User 3's voice.

Referring to FIG. 4, the energy of data related to users' voices received in an entire frequency band 410 is shown according to frequency bands. For example, the energy of the data 421 related to User 1's voice in the entire frequency band 410 may correspond to the intersection between the "User 1's voice" row and the "entire frequency band 410" column in the table shown in FIG. 4. The energy of the data 422 related to User 2's voice in the entire frequency band 410 may correspond to the intersection between the "User 2's voice" row and the "entire frequency band 410" column in the table shown in FIG. 4. The energy of the data 423 related to User 3's voice in the entire frequency band 410 may correspond to the intersection between the "User 3's voice" row and the "entire frequency band 410" column in the table shown in FIG. 4.

Referring to FIG. 4, the energy of data related to users' voice in frequency bands 310, 320, and 330 may be stored in the memory of the electronic device. For example, the data 420 related to User 1's voice, User 2's voice, and User 3's may be previously stored in the memory and may be compared with sound data sensed in real time in the frequency bands.

The data 421 related to User 1's voice, the data 422 related to User 2's voice, and the data 423 related to User 3's voice may be stored in the memory 130 of the electronic device 100. The processor 110 may compare, in each band, received sound data with voice data of at least one user who is previously set as a user of the electronic device 100. For example, sound data, which is compared in each band with data 420 related to a voice of at least one user, may refer to energy in a first band 310, a second band 320, and a third band 330.

Referring to FIG. 4, the energy of sound data sensed by a sound sensor (for example, the sound sensor 120 shown in FIG. 1) may have a distribution in the first band 310, which corresponds to the intersection between the "first band 310" column and a "User n's voice" row (data 421, 422, or 423 related to User n's voice). For example, voice identification may be performed to identify whether a user who inputs sound data into the electronic device is User 1. Before performing voice identification for identifying User 1, the processor may store the data 421 related to User 1's voice in the memory. In this case, the processor may receive the data 421 related to User 1's voice in each frequency band through the sound sensor configured to sense sound data in each frequency band, and may store the data 421 related to User 1's voice in the memory. The processor may perform voice identification by comparing the data 421 related to User 1's voice, which is received in each frequency band and stored in the memory, with sound data which is thereafter received in each frequency band. For example, the processor may compare the data 421 related to User 1's voice, which is received in the first band 310, the second band 320, and the third band 330 and stored in the memory, with sound data which is thereafter received in the first band 310, the second band 320, and the third band 330. The processor may determine, using a voice identification algorithm based on results of the comparison, whether the user who has input the current sound data is User 1 (for example, determining voice identification as successful or unsuccessful).

Referring to FIG. 4, the energy of sound data sensed by the sound sensor may have a distribution in the second band 320, which corresponds to the intersection between the "second band 320" column and a "User n's voice" row (data 421, 422, or 423 related to User n's voice). For example, voice identification may be performed to identify whether a user who inputs sound data into the electronic device is User 2. Before performing voice identification for identifying User 2, the processor may store the data 422 related to User 2's voice in the memory. In this case, the processor may receive the data 422 related to User 2's voice in each frequency band through the sound sensor configured to sense sound data in each frequency band, and may store the data 422 related to User 2's voice in the memory. The processor may perform voice identification by comparing the data 422 related to User 2's voice, which is received in each frequency band and stored in the memory, with sound data which is thereafter received in each frequency band. For example, the processor may compare the data 422 related to User 2's voice, which is received in the first band 310, the second band 320, and the third band 330 and stored in the memory, with sound data which is thereafter received in the first band 310, the second band 320, and the third band 330. The processor may determine, using a voice identification algorithm based on results of the comparison, whether the user who has input the current sound data is User 2 (for example, voice identification success or voice identification failure).

Referring to FIG. 4, the energy of sound data sensed by the sound sensor may have a distribution in the third band 330, which corresponds to the intersection between the "third band 330" column and a "User n's voice" row (data 421, 422, or 423 related to User n's voice). For example, voice identification may be performed to identify whether a user who inputs sound data into the electronic device is User 3. Before performing voice identification for identifying User 3, the processor may store the data 423 related to User 3's voice in the memory. In this case, the processor may receive the data 423 related to User 3's voice in each frequency band through the sound sensor configured to sense sound data in each frequency band, and may store the data 423 related to User 3's voice in the memory. The processor may perform voice identification by comparing the data 423 related to User 3's voice, which is received in each frequency band and stored in the memory, with sound data which is thereafter received in each frequency band. For example, the processor may compare the data 423 related to User 3's voice, which is received in the first band 310, the second band 320, and the third band 330 and stored in the memory, with sound data which is thereafter received in the first band 310, the second band 320, and the third band 330. The processor may determine, using a voice identification algorithm based on results of the comparison, whether the user who has input the current sound data is User 3 (for example, voice identification success or voice identification failure).

Referring to FIG. 4, the processor may receive sound data which is input to the electronic device and may determine, through voice identification, whether the sound data is that of a registered user of the electronic device (for example, User 1, User 2, or User 3). For example, the processor may perform voice identification by comparing, in each frequency band (for example, the first band 310, the second band 320, and the third band 330), sound data received through the sound sensor with the data 421 related to User 1's voice, the data 422 related to User 2' voice, and the data 423 related to User 3's voice to find data matching the received sound data. The processor may compare sound data received in each frequency band with the energy of the data 421 related to User 1's voice, the energy of the data 422 related to User 2' voice, and the energy of the data 423 related to User 3's voice which are stored according to frequency bands in the form of a table. For example, when arbitrary sound data is input, the processor may receive table-type data from the memory to determine whether the sound data is that of a user registered in the electronic device. The processor may compare input arbitrary sound data with the received table-type data in each frequency band (for example, the first band 310, the second band 320, and the third band 330). When results of the comparison in each frequency band shows that the input arbitrary sound data matches the data 421 related to User 1's voice in two bands or more, the processor may determine that the voice identification is successful. When results of the comparison in each frequency band shows that the input arbitrary sound data matches the data 421 related to User 1's voice only in one band, the processor may determine that the voice identification is unsuccessful. Also, when results of the comparison in each frequency band shows that the input arbitrary sound data does not match the data 421 related to User 1's voice in any band, the processor may determine that the voice identification is unsuccessful. For example, when the processor determines that the input arbitrary sound data matches the data 421, 422, or 423 related to User n's voice in more than fifty percent of n frequency bands (for example, n refers to an add number), the processor may determine that the voice identification is successful for User n. When the processor determines that the input arbitrary sound data matches the data 421, 422, or 423 related to User n's voice in less than fifty percent of the n frequency bands (for example, n refers to an add number), the processor may determine that the voice identification is unsuccessful for User n.

Figure 5:
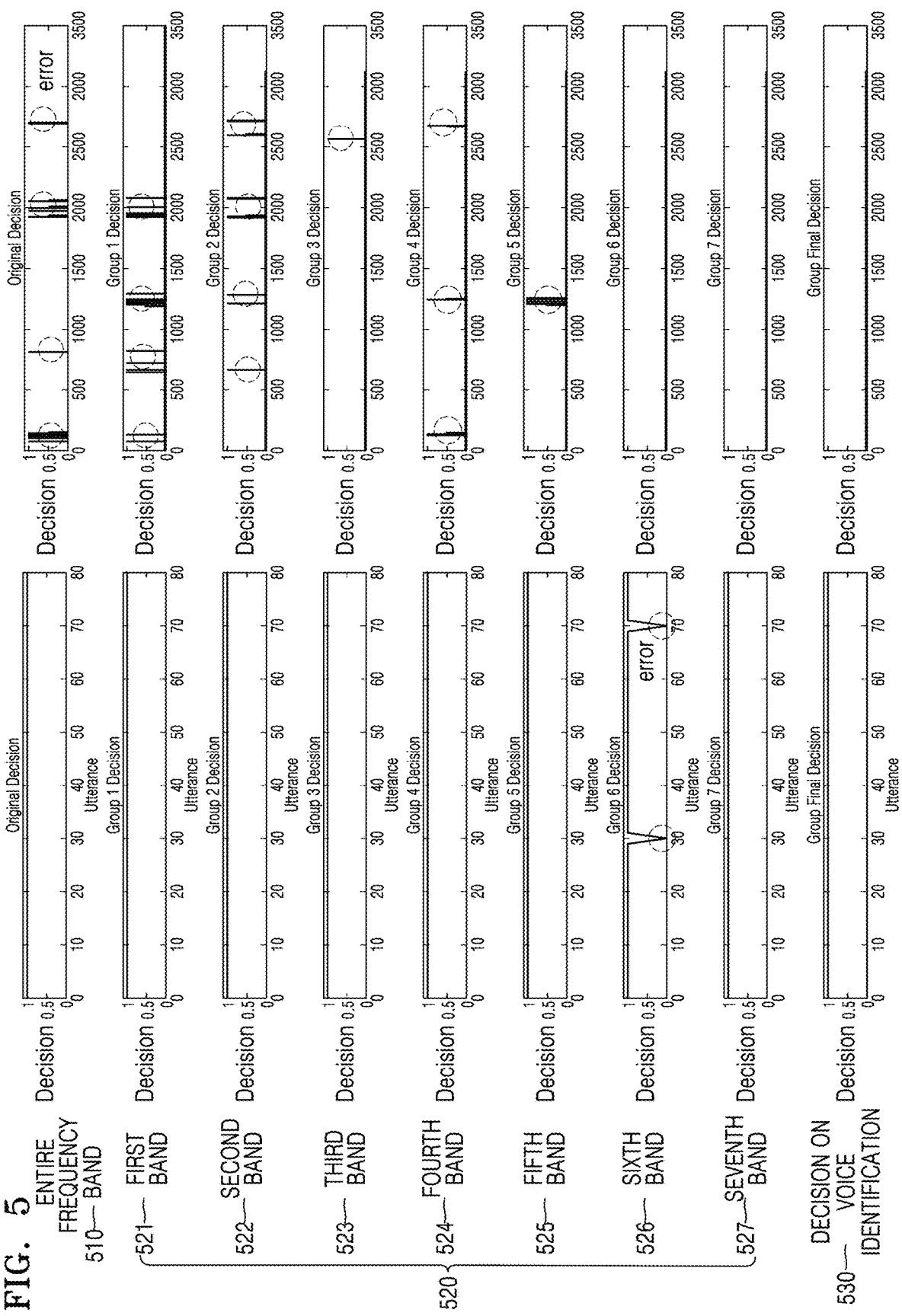
FIG. 5 is an example view illustrating a voice identification method for determining whether there is an error in voice data of a user according to various example embodiments.

FIG. 5 is an example view illustrating a voice identification method for determining whether there is an error in voice data of a user according to various example embodiments.

Referring to FIG. 5, a decision on voice identification may be denoted as successful or unsuccessful. For example, a decision of 1 may refer to a successful voice identification. For example, a decision of 0 may refer to an unsuccessful voice identification. A successful voice identification may refer to the case in which decision is consistently 1. For example, the case in which decision is inconsistently 1 or 0 may refer to an unsuccessful voice identification. The case in which decision is inconsistently 1 or 0 may be determined as a case in which an error occurs during voice identification. A successful voice identification may refer to the case in which input sound data matches data related to the voice of at least one user among a plurality of registered users of an electronic device. An unsuccessful voice identification may refer to the case in which input sound data does not match data related to any one of the plurality of registered users of the electronic device.

Referring to FIG. 5, decisions on voice identification, which are shown on the left and right sides, may be obtained based on different pieces of sound data, respectively. For example, nine decisions on voice identification which are shown on the left side may be obtained based on the same sound data. For example, nine decisions on voice identification which are shown on the right side may be obtained based on sound data different from the sound data which is used to derive the nine decisions on the left side. A decision 530 on the lowest side in FIG. 5 may be a decision derived by performing voice identification in seven bands 520 and then applying a preset determination algorithm (for example, a voting algorithm, a weighted sum algorithm, or the like) to results thereof.

FIG. 5 shows decisions on voice identification which is performed on sound data input to an electronic device (for example, the electronic device 100 shown in FIG. 1). Referring to FIG. 5, in an entire frequency band 510, decisions shown on the left and right sides may be different from each other. For example, the left decision in the entire frequency band 510 may indicate a successful voice identification (for example, results of decision are always 1) in which data is recognized as voice data of one of a plurality of registered users of the electronic device. For example, the decision in the entire frequency band 510 which is shown on the right side have voice identification errors because data is inconsistently recognized as being or not being voice data of one of the plurality of registered users of the electronic device, that is, a voice identification failure (for example, results of decision are inconsistently 1 and 0)

Referring to FIG. 5, a processor (for example, the processor 110 shown in FIG. 1) may receive sound data in the seven bands 520 through a sound sensor (for example, the sound sensor 120 shown in FIG. 1) and may perform voice identification on the sound data. For example, the processor may receive sound data in each of the seven bands 520, that is, in a first band 521, a second band 522, a third band 523, a fourth band 524, a fifth band 525, a sixth band 526, and a seventh band 527, and may determine whether the sound data in each of the seven bands 520 is that of a user of the plurality of registered users of the electronic device. The sound data, which the processor has received in the seven bands 520, that is, the first to seventh bands 521 to 527, may be compared, in each of the seven bands 520, with voice data of the plurality of registered users which is stored in a memory (for example, the memory 130).

Referring to FIG. 5, among the left decisions on voice identification in the seven bands 520, the decisions in the first band 521, the second band 522, the third band 523, the fourth band 524, the fifth band 525, and the seventh band 527 are consistently 1. However, the decision in the sixth band 526 is 0 twice with time, that is, there are errors indicating that the decision is not consistently 1. Among the left decisions on voice identification in the seven bands 520, there are errors only in one band (for example, the sixth band 526), and the decisions in bands more than a preset number of bands (for example, three bands) are consistently 1, such that the decision 530 finally made on voice identification may be a success.

Referring to FIG. 5, among the right decisions on voice identification in the seven bands 520, the decisions in the sixth band 526 and the seventh band 527 are consistently 0. However, the decisions in the first band 521, the second band 522, the third band 523, the fourth band 524, and the fifth band 525 are inconsistently 0 and 1 with time, showing errors. Among the decisions on voice identification in the seven bands 520 which are shown on the right side, errors are present in five bands (for example, the first band 521, the second band 522, the third band 523, the fourth band 524, and the fifth band 525), but the decisions are 0 in bands more than a preset number of bands (for example, three bands) such that the decision 530 finally made on voice identification may be a failure.

Figure 6:
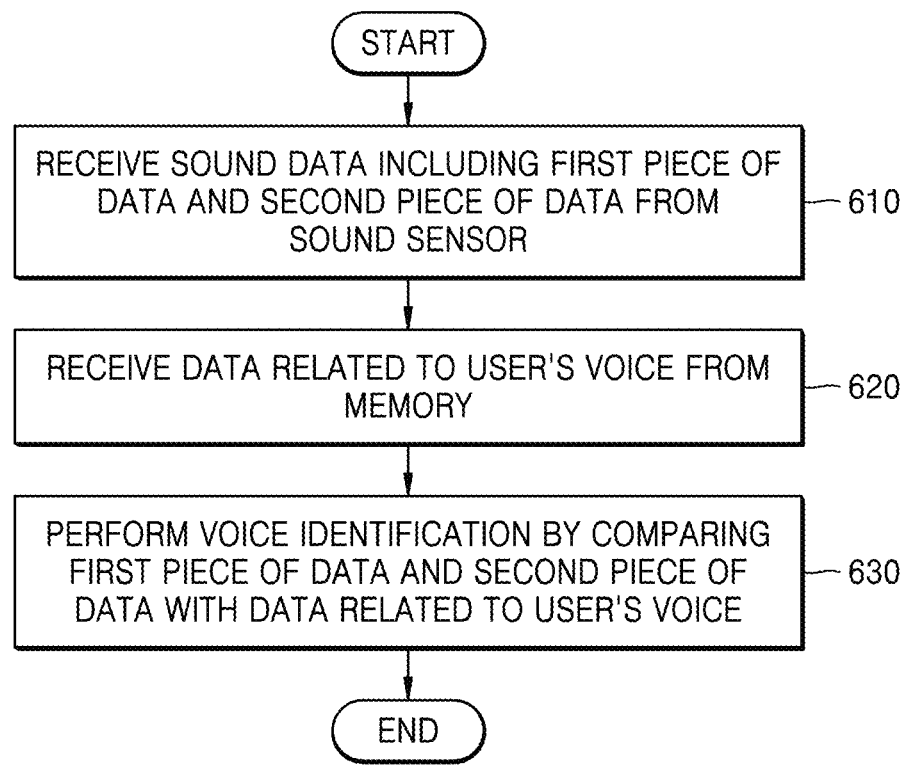
FIG. 6 is a flowchart illustrating a voice identification method according to various example embodiments.

FIG. 6 is a flowchart illustrating a voice identification method according to various example embodiments.

Referring to FIG. 6, in operation 610, a processor (for example, the processor 110 shown in FIG. 1) of an electronic device (for example, the electronic device 100 shown in FIG. 1) may receive sound data from a sound sensor (for example, the sound sensor 120 shown in FIG. 1). The sound data may include a first piece of data corresponding to a first frequency band and a second piece of data corresponding to a second frequency band. For example, the sound sensor may include a plurality of mechanical oscillators capable of sensing sound data in different frequency bands, and may thus sense sound data in different frequency bands by using the plurality of mechanical oscillators. That is, the sound sensor may sense sound data distinguishably in the first frequency band and the second frequency band by using at least one mechanical oscillator capable of sensing sound data in the first frequency band and at least one mechanical oscillator capable of sensing sound data in the second frequency band. The processor may receive the sound data which is sensed in the frequency bands by the sound sensor.

Referring to FIG. 6, in operation 620, the processor may receive data related to the voice of a user from a memory (for example, the memory 130 shown in FIG. 1). For example, the user may refer to at least one user of a plurality of registered users of the electronic device. The data related to user's voice may refer to data related to the voice of a plurality of users registered as users of the electronic device. The data related to user's voice may be previously stored in the memory, and when a user is additionally registered, the data related to user's voice may be updated. Here, data may be transmitted, received, and stored by any method without limitations.

Referring to FIG. 6, in operation 630, the processor may perform voice identification by comparing the first piece of data and the second piece of data with the data related to user's voice in each relevant frequency band. For example, the processor may perform voice identification by comparing the data related to user's voice with the first piece of data in the first frequency band. In addition, the processor may perform voice identification by comparing the data related to user's voice with the second piece of data in the second frequency band. In this case, the data related to user's voice in the first frequency band and the data related to user's voice in the second frequency band may refer to voice data of a registered user which is previously stored in the memory (for example, the memory 130 shown in FIG. 1).

Figure 7:
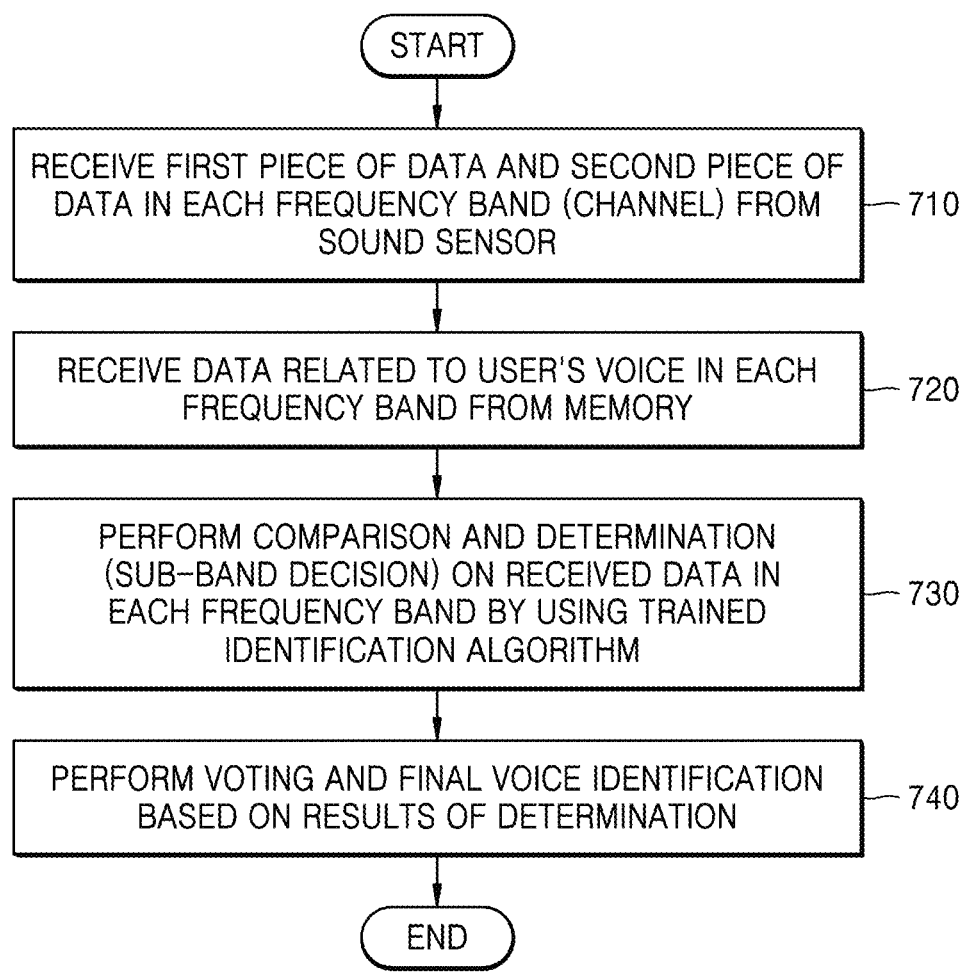
FIG. 7 is a flowchart illustrating a method of identifying a voice in each frequency band according to various example embodiments.

FIG. 7 is a flowchart illustrating a method of identifying a voice in each frequency band according to various example embodiments.

Referring to FIG. 7, in operation 710, a processor (for example, the processor 110 shown in FIG. 1) of an electronic device (for example, the electronic device 100 shown in FIG. 1) may receive a first piece of data and a second piece of data in frequency bands from is a sound sensor (for example, the sound sensor 120 shown in FIG. 1). In an embodiment, the sound sensor may have a plurality of sub-bands (or channels) respectively having characteristics of the frequency bands. A sound input to the sound sensor may be sensed in each of the frequency bands through the plurality of sub-bands.

The processor may receive frequency-band-based data which is sensed in the plurality of sub-bands by the sound sensor. For example, the processor may receive, from the sound sensor, the first piece of data sensed in a first sub-band (or a first channel) having characteristics of the first frequency band. In addition, the processor may receive, from the sound sensor, the second piece of data sensed in a second sub-band (or a second channel) having characteristics of the second frequency band different from the first frequency band.

Referring to FIG. 7, in operation 720, the processor may receive data related to user's voice in each frequency band from a memory (for example, the memory 130 shown in FIG. 1). For example, the data related to user's voice in each frequency band may refer to data which is related to the voice of a registered user of the electronic device and is divided according to frequency bands.

Referring to FIG. 7, in operation 730, the processor may perform comparison and determination (sub-band decision) on the received data in each frequency band by a trained identification algorithm.

The processor may compare the first piece of data sensed in the first sub-band having characteristics of the first frequency band with data in the first frequency band among the data related to the voice of the registered user. In addition, the processor may compare the second piece of data sensed in the second sub-band having characteristics of the second frequency band with data in the second frequency band among data related to the voice of the registered user. The processor may perform comparison in parallel on the data in the first frequency band and the second frequency band.

The processor may compare the data received in each frequency band with the data related to the voice of the registered user which is previously stored according to the frequency bands, and may accept the received data when the similarity between the data is greater than or equal to a degree of similarity and may reject the received data when the similarity between the data is less than the degree of similarity. According to an example embodiment, the degree of similarity may be preset. According to an example embodiment, the processor may perform determination in parallel on the first piece of data and the second piece of data.

Referring to FIG. 7, in operation 740, the processor may perform voting and final voice identification based on results of the determination on the data received in each frequency band. For example, when the number of accepted pieces of data among the received data is greater than the number of rejected pieces of data among the received data, the processor may determine results of the voting as acceptance and may thus finally determine that voice identification is successful. In another example, when the number of accepted pieces of data among the received data is greater than a preset number of acceptances, the processor may determine results of the voting as acceptance and may finally determine that voice identification is successful.

Figure 8:
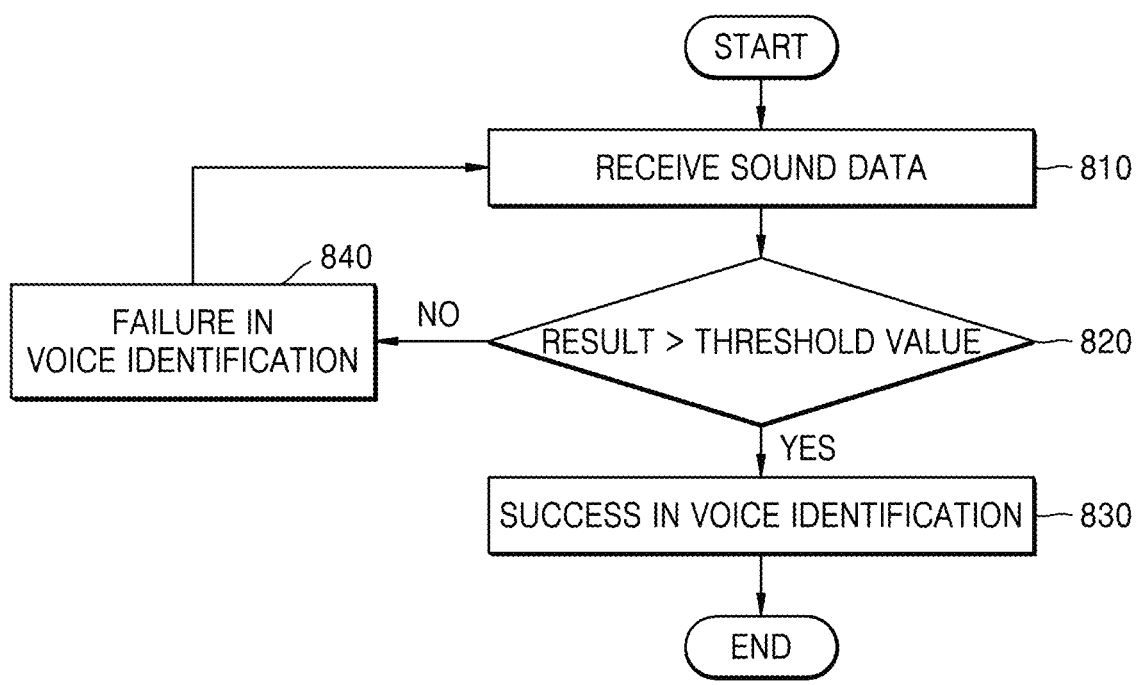
FIG. 8 is a flowchart illustrating a process of deriving results in a voice identification method according to various example embodiments.

FIG. 8 is a flowchart illustrating a process of deriving results in a voice identification method according to various example embodiments.

Referring to FIG. 8, in operation 810, a processor (for example, the processor 110 shown in FIG. 1) of an electronic device (for example, the electronic device 100 shown in FIG. 1) may receive sound data from a sound sensor (for example, the sound sensor 120 shown in FIG. 1). The sound data may include a first piece of data corresponding to a first frequency band and a second piece of data corresponding to a second frequency band. For example, the sound sensor may include a plurality of mechanical oscillators capable of sensing sound data in different frequency bands, and may thus sense sound data in different frequency bands by using the plurality of mechanical oscillators. That is, the sound sensor may sense sound data distinguishably in the first frequency band and the second frequency band by using at least one mechanical oscillator capable of sensing sound data in the first frequency band and at least one mechanical oscillator capable of sensing sound data in the second frequency band. The processor may receive the sound data which is sensed in the frequency bands by the sound sensor.

Referring to FIG. 8, in operation 820, the processor may compare results of voice identification with a threshold value. According to an example embodiment, the threshold value may be preset. The processor may compare the sound data received according to the frequency bands with band-based data of data related to user's voice stored in a memory (for example, the memory 130 shown in FIG. 1). For example, the processor may calculate a first representative value corresponding to the first piece of data and a second representative value corresponding to the second piece of data. The processor may compare a weighted sum of the first representative value and the second representative value with a preset threshold value. In another example embodiment, the processor may calculate a weighted sum of raw data of the first piece of data and raw data of the second piece of data. The processor may compare the calculated weighted sum with a preset threshold value.

Referring to FIG. 8, in operation 830, when it is determined that results of the calculation is greater than a preset threshold value during voice identification, the processor may determine that the voice identification is successful. For example, when more than fifty percent of results of determination in the first frequency band, determination in the second frequency band, . . . , and determination in an n-th frequency band (for example, n is an odd number) are acceptance results (for example, if a value 1, among 1 and 0, refers to acceptance, and the number of 1s is greater than n/2), the processor may determine that the voice identification is successful. In operation 840, when it is determined that results of the calculation are less than the preset threshold value during voice identification, the processor may determine that the voice identification is unsuccessful. For example, when more than fifty percent of results of determination in the first frequency band, determination in the second frequency band, . . . , and determination in the n-th frequency band (for example, n is an odd number) are rejection results (for example, if a value, 1 among 1 and 0 refers to acceptance, and the number of 0s is greater than n/2), the processor may determine that the voice identification is unsuccessful. After determining that the voice identification is unsuccessful in operation 840, the processor may return to operation 810 and perform voice identification on sound data.

Figure 9A:
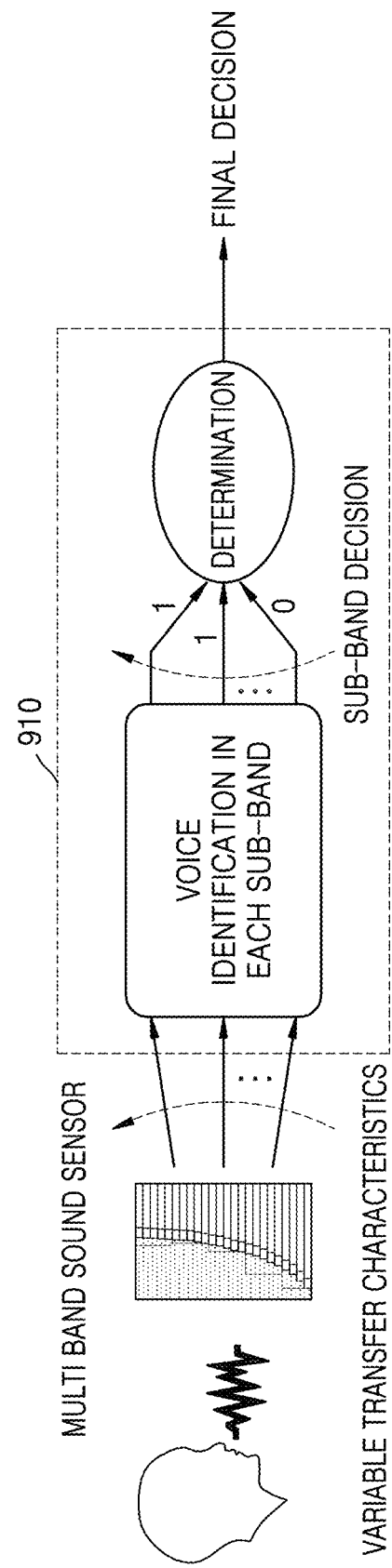
FIGS. 9A to 9C are example views illustrating voice identification methods according to various example embodiments.
Figure 9B:
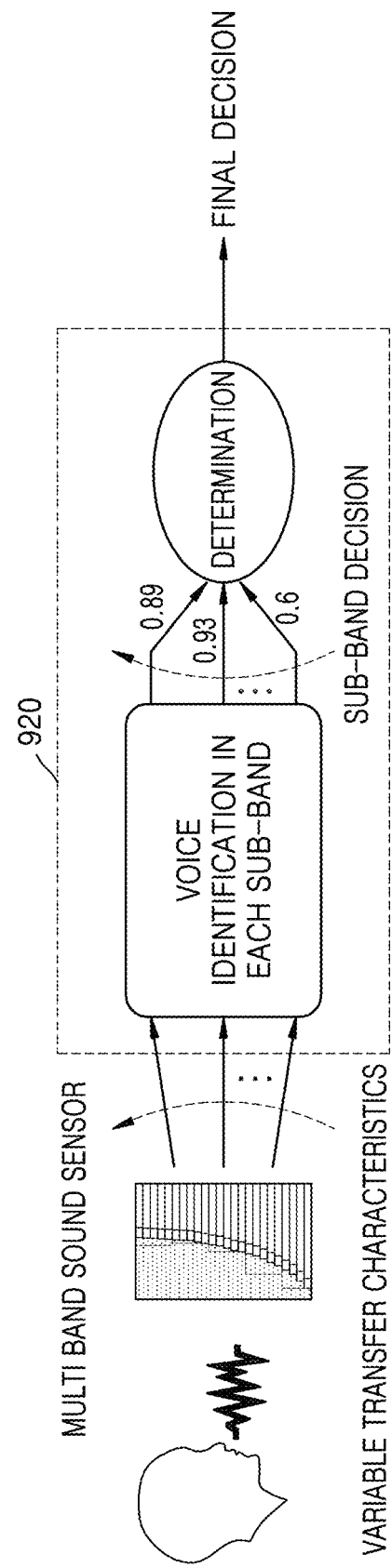
Figure 9C:
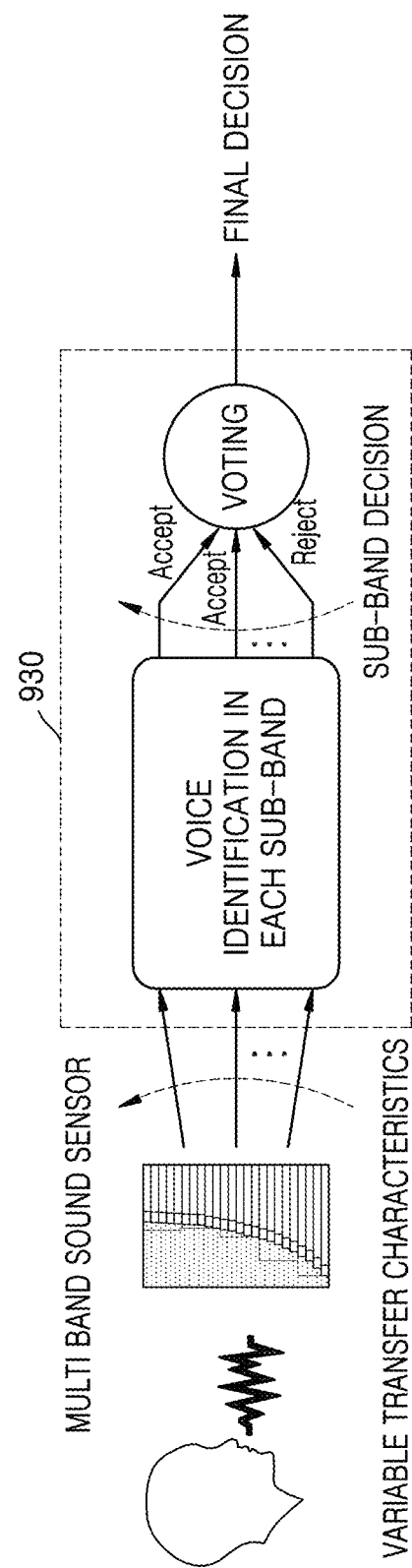

FIGS. 9A to 9C are example views illustrating voice identification methods according to various example embodiments.

Referring to FIG. 9A, a processor (for example, the processor 110 shown in FIG. 1) may perform band-based calculation on at least one sound data sensed through a sound sensor (for example, the sound sensor 120 shown in FIG. 1). The processor may be included in a voice identification module 910. For example, the processor may calculate a first representative value corresponding to a first piece of data and a second representative value corresponding to a second piece of data. The processor may compare a weighted sum of the first representative value and the second representative value with a preset threshold value. Each of the representative values may be a value obtained by multiplying raw data by a preset constant, and may be indicated as a decision of 1 or 0. For example, a decision of 1 may refer to a successful voice identification, and a decision of 0 may refer to an unsuccessful voice identification. For example, the processor may compare representative values in first to nth bands (for example, n is an odd number) with previously stored data related to user's voice in each band to derive decisions (sub-band decisions) and then may derive a final decision through a final determination algorithm. In addition, the processor may determine whether voice identification is successful by combining the derived decisions.

Referring to FIG. 9B, the processor may calculate a weighted sum of raw data (for example, 0.889, 0.93, and 0.6) of the first piece of data and the second piece of data. The processor may be included in a voice identification module 920. The processor may compare the calculated weighted sum with a preset threshold value. While performing voice identification, the processor may determine that the voice identification is successful when results of the calculation are greater than a preset threshold value. While performing voice identification, the processor may determine that the voice identification is unsuccessful when results of the calculation are less than the preset threshold value.

Referring to FIG. 9C, based on results of voting regarding the number of accepts and the number of rejects, the processor may determine voice identification as successful or unsuccessful. The processor may be included in a voice identification module 930. When more than fifth percent of results of voting in a first band, results of voting in a second band, . . . , and results of voting in an nth band (for example, n refers to an odd number) are accepts (for example, there are accepts and rejects, and the number of accepts is greater than n/2), the processor may determine that the voice identification is successful. When more than fifth percent of results of decision in the first band, results of decision in the second band, . . . , and results of decision the nth band (for example, n refers to an odd number) are rejects (for example, there are accepts and rejects, and the number of rejects is greater than n/2), the processor may determine that the voice identification is unsuccessful.

Figure 10A:
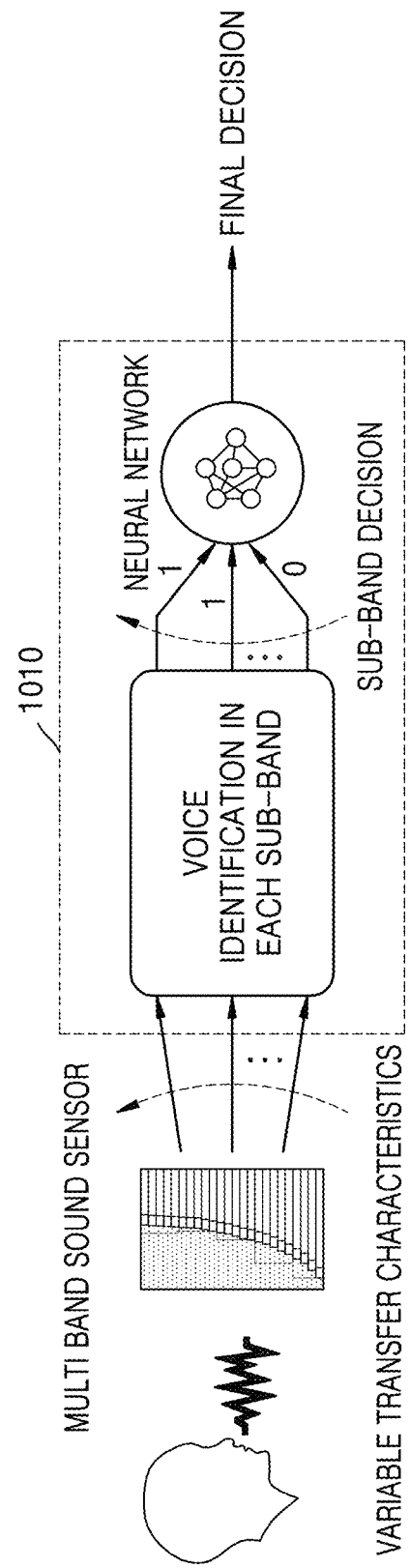
FIGS. 10A and 10B are example views illustrating voice identification methods using neural networks according to various example embodiments.
Figure 10B:
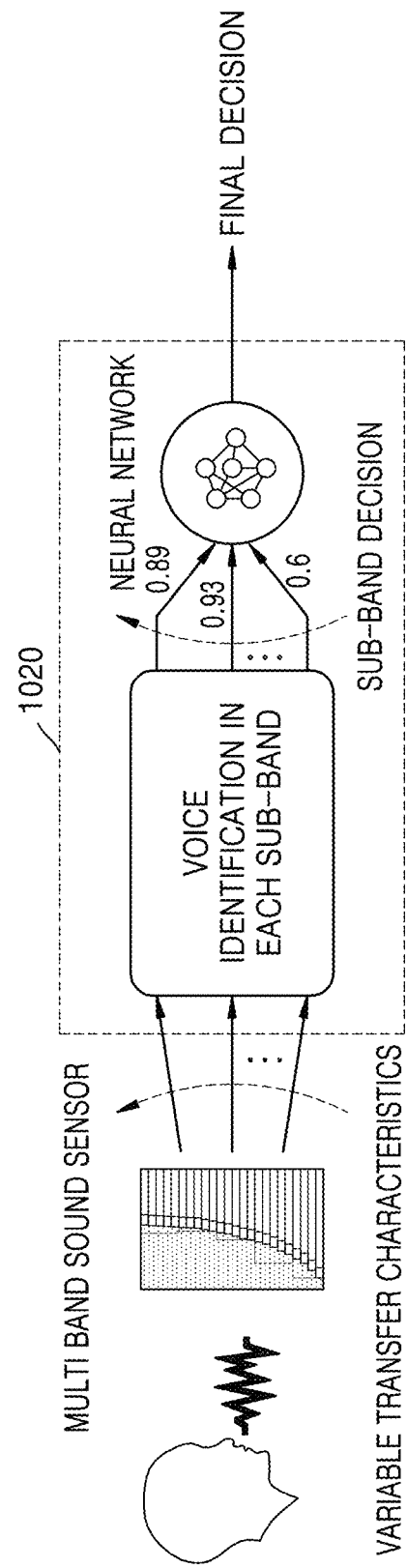

FIGS. 10A and 10B are example views illustrating voice identification methods using neural networks according to various example embodiments.

Referring to FIG. 10A, a processor (for example, the processor 110 shown in FIG. 1) may perform band-based calculation on at least one sound data sensed through a sound sensor (for example, the sound sensor 120 shown in FIG. 1). The processor may be included in a voice identification module 1010. For example, the processor may calculate a first representative value corresponding to a first piece of data and a second representative value corresponding to a second piece of data. The processor may compare a weighted sum of the first representative value and the second representative value with a preset threshold value. Each of the representative values may be a value obtained by multiplying raw data by a preset constant, and may be indicated as a decision of 1 or 0. For example, a decision of 1 may refer to a successful voice identification, and a decision of 0 may refer to an unsuccessful voice identification. For example, the processor may compare representative values in first to nth bands (for example, n is an odd number) with previously stored data related to user's voice in each band to derive decisions (sub-band decisions) and then may determine whether voice identification is successful by combining the derived decisions. The voice identification module 1010 may determine, using a neural network, whether voice identification is successful. For example, the neural network may repeatedly compare data related to the voice of a plurality of registered users of an electronic device (for example, the electronic device 100 shown in FIG. 1) with the received sound data. The neural network may use results obtained by repeating voice identification to adaptively perform voice identification by considering sound data variations caused by variations in the body conditions of the users. The neural network may include a processor or may additionally include a neural processor.

Referring to FIG. 10B, the processor may calculate a weighted sum of raw data (for example, 0.889, 0.93, and 0.6) of the first piece of data and the second piece of data. The processor may be included in a voice identification module 1020. The processor may compare the calculated weighted sum with a preset threshold value. While performing voice identification, the processor may determine that the voice identification is successful when results of the calculation are greater than a preset threshold value. While performing voice identification, the processor may determine that the voice identification is unsuccessful when results of the calculation are less than the preset threshold value. For example, the neural network may repeatedly compare data related to the voice of a plurality of registered users of an electronic device with the received sound data. The neural network may use results obtained by repeating voice identification to adaptively perform voice identification by considering sound data variations caused by variations in the body conditions of the users. The neural network may include a processor or may additionally include a neural processor.

Each of the voice identification modules 910, 920, 930, 1010, and 1020 shown in FIGS. 9A to 10B may have an algorithm for determining whether voice identification is successful. For example, each of the voice identification modules 910, 920, 930, 1010, and 1020 may have at least one of the algorithms shown in FIGS. 9A to 10B and may perform voice identification using the at least one algorithm.

According to an aspect of an embodiment, an electronic device may include: a memory; a sound sensor; and a processor, wherein the processor may be configured to: receive, from the sound sensor, sound data including a first piece of data corresponding to a first frequency band and a second piece of data corresponding to a second frequency band different from the first frequency band; receive data related to registered user's voice from the memory; perform voice identification by comparing the first piece of data and the second piece of data with the data related to the registered user's voice; and determine an output according to results of the voice identification.

The sound sensor may include a plurality of mechanical oscillators, and the plurality of mechanical oscillators may be configured to sense sound data according to frequency bands.

The plurality of mechanical oscillators may include at least one mechanical oscillator configured to sense sound data in a first band and at least one mechanical oscillator configured to sense sound data in a second band.

The data related to the registered user's voice may include user's voice data in the first frequency band and user's voice data in the second frequency band.

When the processor performs the voice identification, the processor may be further configured to compare the first piece of data with the user's voice data in the first frequency band, and the second piece of data with the user's voice data in the second frequency band.

When performing the voice identification, the processor may be further configured to: calculate a first representative value that is a representative value of the first piece of data and a second representative value that is a representative value of the second piece of data; and compare a weighted sum of the first representative value and the second representative value with a preset threshold value.

When performing the voice identification, the processor may be further configured to: calculate a weighted sum of raw data of the first piece of data and raw data of the second piece of data; and compare the calculated weighted sum with a preset threshold value.

The processor may be further configured to: determine, based on results of the comparison between the first piece of data and the user's voice data in the first frequency band, whether the sound data matches the registered user's voice in the first frequency band; and determine, based on results of the comparison between the second piece of data and the user's voice data in the second frequency band, whether the sound data matches the registered user's voice in the second frequency band.

The processor may be further configured to determine that the voice identification is successful when the weighted sum is greater than the preset threshold value.

The processor may be further configured to determine that the voice identification is successful when a sum of a result of the determination in the first frequency band and a result of the determination in the second frequency band is greater than a preset threshold value.

According to an aspect of another embodiment, there may be provided a method of identifying a voice using an electronic device, the method including: receiving, from a sound sensor, sound data including a first piece of data corresponding to a first frequency band and a second piece of data corresponding to a second frequency band different from the first frequency band; receiving data related to registered user's voice from a memory; performing voice identification by comparing the first piece of data and the second piece of data with the data related to the registered user's voice; and determining an output according to results of the voice identification.

The sound sensor may include a plurality of mechanical oscillators, and the method further may include sensing sound data according to frequency bands by using the plurality of mechanical oscillators.

The sensing of the sound data according to the frequency bands may include: sensing sound data in a first band by using at least one of the plurality of mechanical oscillators; and sensing sound data in a second band by using at least one of the plurality of mechanical oscillators.

The data related to the registered user's voice may include user's voice data in the first frequency band and user's voice data in the second frequency band.

The performing of the voice identification may include: comparing the first piece of data with the user's voice data in the first frequency band; and comparing the second piece of data with the user's voice data in the second frequency band.

The performing of the voice identification further may include: calculating a first representative value that is a representative value of the first piece of data and a second representative value that is a representative value of the second piece of data; and comparing a weighted sum of the first representative value and the second representative value with a preset threshold value.

The performing of the voice identification further may include: calculating a weighted sum of raw data of the first piece of data and raw data of the second piece of data; and comparing the calculated weighted sum with a preset threshold value.

The method may further include: determining, based on results of the comparing between the first piece of data and the user's voice data in the first frequency band, whether the sound data matches the registered user's voice in the first frequency band; and determining, based on results of the comparing between the second piece of data and the user's voice data in the second frequency band, whether the sound data matches the registered user's voice in the second frequency band.

The determining of the output may include determining that the voice identification is successful when the weighted sum is greater than the preset threshold value.

The determining of the output may include determining that the voice identification is successful when a sum of a result of the determining in the first frequency band and a result of the determining in the second frequency band is greater than a preset threshold value.

As described above, according to the one or more of the above example embodiments, in the voice identification method, user's voice data may be received through a multi-band sound sensor capable of sensing voice data distinguishably according to frequency bands. When the sound sensor of the electronic device receives sound data distinguishably according to frequency bands, user's voice identification may be performed in each frequency band. When the sound sensor includes a plurality of mechanical oscillators, the electronic device may increase the accuracy of voice identification by performing the voice identification according to characteristics of a plurality of frequency bands.

When performing user's voice identification, the electronic device may receive voice data in each frequency band through the sound sensor. The electronic device may reduce errors in voice identification by comparing, in each frequency band, the received voice data with voice data of users updated and stored in a memory.

It should be understood that example embodiments described herein should be considered in a descriptive sense only and not for purposes of limitation. Descriptions of features or aspects within each example embodiment should typically be considered as available for other similar features or aspects in other example embodiments. While one or more example embodiments have been described with reference to the figures, it will be understood by those of ordinary skill in the art that various changes in form and details may be made therein without departing from the spirit and scope as defined by the following claims.

What is claimed is:

1. An electronic device comprising:
   a memory;
   a sound sensor; and
   a processor configured to:
      receive, from the sound sensor, sound data comprising a first piece of data corresponding to a first frequency band, a second piece of data corresponding to a second frequency band, and a third piece of data corresponding to a third frequency band, the first frequency band, the second frequency band and the third frequency band being different from each other;
      receive voice data related to a voice of a registered user from the memory;
      perform voice identification by comparing the first piece of data, the second piece of data, and the third piece of data with the voice data related to the voice of the registered user in each relevant frequency band among the first frequency band, the second frequency band and the third frequency band; and
      determine an output based on a result of the voice identification,
   wherein the sound sensor comprises a plurality of mechanical oscillators configured to sense the sound data according to frequency bands,
   wherein the plurality of mechanical oscillators comprise:

two or more first mechanical oscillators configured to sense the sound data in the first frequency band,
two or more second mechanical oscillators configured to sense the sound data in the second frequency band, and
two or more third mechanical oscillators configured to sense the sound data in the third frequency band,
wherein the processor is further configured to perform the voice identification by:
determining whether to accept or reject the first piece of data based on a similarity between the first piece of data and the voice data related to the voice of the registered user in the first frequency band,
determining whether to accept or reject the second piece of data based on a similarity between the second piece of data and the voice data related to the voice of the registered user in the second frequency band, and
determining whether to accept or reject the third piece of data based on a similarity between the third piece of data and the voice data related to the voice of the registered user in the third frequency band, and
wherein the processor is further configured to determine the output based on the result of the voice identification by:
determining final voice identification is successful based on a number of accepted pieces of data being greater than a number of rejected pieces of data, among the first, second and third pieces of data when at least one piece of data has been rejected.

2. The electronic device of claim 1, wherein the voice data related to the voice of the registered user comprises first voice data in the first frequency band and second voice data in the second frequency band.

3. The electronic device of claim 2, the processor is further configured to perform the voice identification by comparing the first piece of data with the first voice data in the first frequency band, and the second piece of data with the second voice data in the second frequency band.

4. The electronic device of claim 3, wherein the processor is further configured to perform the voice identification by:
determining a first representative value corresponding to the first piece of data and a second representative value corresponding to the second piece of data; and
comparing a weighted sum of the first representative value and the second representative value with a threshold value.

5. The electronic device of claim 3, wherein the processor is further configured to:
determine, based on a result of the comparing the first piece of data and the first voice data in the first frequency band, whether the sound data matches the voice of the registered user in the first frequency band; and
determine, based on a result of the comparing the second piece of data and the second voice data in the second frequency band, whether the sound data matches the voice of the registered user in the second frequency band.

6. The electronic device of claim 4, wherein the processor is further configured to determine that the voice identification is successful when the weighted sum is greater than the threshold value.

7. The electronic device of claim 5, wherein the processor is further configured to determine that the voice identification is successful when a sum of a result of the determination in the first frequency band and a result of the determination in the second frequency band is greater than a threshold value.

8. A method of identifying a voice using an electronic device, the method comprising:
receiving, from a sound sensor, sound data comprising a first piece of data corresponding to a first frequency band, a second piece of data corresponding to a second frequency band, and a third piece of data corresponding to a third frequency band, the first frequency band, the second frequency band and the third frequency band being different from each other;
receiving voice data related to a voice of a registered user from a memory;
performing voice identification by comparing the first piece of data, the second piece of data, and the third piece of data with the voice data related to the voice of the registered user in each relevant frequency band among the first frequency band, the second frequency band and the third frequency band; and
determining an output based on a result of the voice identification,
wherein the sound sensor comprises a plurality of mechanical oscillators, and
wherein the method further comprises:
sensing the sound data according to frequency bands by using the plurality of mechanical oscillators,
wherein the sensing of the sound data according to the frequency bands comprises:
sensing the sound data in the first frequency band by using two or more first mechanical oscillators among the plurality of mechanical oscillators,
sensing the sound data in the second frequency band by using two or more second mechanical oscillators among the plurality of mechanical oscillators, and
sensing the sound data in the third frequency band by using two or more third mechanical oscillators among the plurality of mechanical oscillators, and
wherein the performing the voice identification further comprises:
determining whether to accept or reject the first piece of data based on a similarity between the first piece of data and the voice data related to the voice of the registered user in the first frequency band,
determining whether to accept or reject the second piece of data based on a similarity between the second piece of data and the voice data related to the voice of the registered user in the second frequency band, and
determining whether to accept or reject the third piece of data based on a similarity between the third piece of data and the voice data related to the voice of the registered user in the third frequency band, and
wherein determining the output based on the result of the voice identification comprises:
determining final voice identification is successful based on a number of accepted pieces of data being greater than a number of rejected pieces of data, among the first, second and third pieces of data when at least one piece of data has been rejected.

9. The method of claim 8, wherein the voice data related to the voice of the registered user comprises first voice data in the first frequency band and second voice data in the second frequency band.

10. The method of claim 9, wherein the performing of the voice identification comprises:

comparing the first piece of data with the first voice data in the first frequency band; and comparing the second piece of data with the second voice data in the second frequency band.

11. The method of claim 10, wherein the performing of the voice identification further comprises:

determining a first representative value corresponding to the first piece of data and a second representative value corresponding to the second piece of data; and comparing a weighted sum of the first representative value and the second representative value with a threshold value.

12. The method of claim 10, further comprising:

determining, based on result of the comparing the first piece of data and the first voice data in the first frequency band, whether the sound data matches the voice of the registered user in the first frequency band; and determining, based on a result of the comparing the second piece of data and the second voice data in the second frequency band, whether the sound data matches the voice of the registered user in the second frequency band.

13. The method of claim 11, wherein the determining of the output comprises determining that the voice identification is successful when the weighted sum is greater than the threshold value.

14. The method of claim 12, wherein the determining of the output comprises determining that the voice identification is successful when a sum of a result of the determining in the first frequency band and a result of the determining in the second frequency band is greater than a threshold value.

* * * * *